United States Patent
Nielsen

(10) Patent No.: US 12,498,743 B2
(45) Date of Patent: Dec. 16, 2025

(54) THERMAL SYSTEM FOR A MARINE VESSEL, SUCH SYSTEM INSTALLED IN A MARINE VESSEL, A MARINE VESSEL COMPRISING THE THERMAL SYSTEM, A METHOD OF CONTROLLING A THERMAL SYSTEM, AND A CONTROL DEVICE

(71) Applicant: Frese A/S, Slagelse (DK)

(72) Inventor: Rasmus Frimann Wolff Nielsen, Næstved (DK)

(73) Assignee: Frese A/S, Slagelse (DK)

( * ) Notice: Subject to any disclaimer, the term of this patent is extended or adjusted under 35 U.S.C. 154(b) by 0 days.

(21) Appl. No.: 18/727,555

(22) PCT Filed: Jan. 6, 2023

(86) PCT No.: PCT/DK2023/050004
§ 371 (c)(1),
(2) Date: Jul. 9, 2024

(87) PCT Pub. No.: WO2023/131384
PCT Pub. Date: Jul. 13, 2023

(65) Prior Publication Data
US 2025/0123640 A1    Apr. 17, 2025

(30) Foreign Application Priority Data
Jan. 10, 2022    (DK) .......................... PA 2022 70007

(51) Int. Cl.
*G05D 23/19*    (2006.01)
*B63H 21/38*    (2006.01)
(Continued)

(52) U.S. Cl.
CPC ....... *G05D 23/1932* (2013.01); *B63H 21/383* (2013.01); *B63J 2/02* (2013.01); *B63J 2/12* (2013.01)

(58) Field of Classification Search
CPC ..... B63H 21/383; B63J 2/02; G05D 23/1932; F24F 2140/12
See application file for complete search history.

(56) References Cited

U.S. PATENT DOCUMENTS

5,669,224 A * 9/1997 Lenarduzzi ............. F25B 41/24
                                                    62/238.7
6,390,381 B1 * 5/2002 Laing ................. G05D 23/1932
                                                       237/63
(Continued)

FOREIGN PATENT DOCUMENTS

CN    203473236 U    3/2014
CN    206031738 U    3/2017
(Continued)

OTHER PUBLICATIONS

International Search Report and written opinion received in related international application No. PCT/DK2023/050004, dated Apr. 18, 2023.
(Continued)

*Primary Examiner* — Nelson J Nieves
(74) *Attorney, Agent, or Firm* — AVEK IP, LLC

(57) ABSTRACT

A thermal system for a marine vessel includes a thermal liquid circuit; a pump system for circulating a thermal liquid in the thermal liquid circuit; a number of thermal consumers; and a control device for controlling the pump system. The thermal consumers are arranged in parallel in the thermal liquid circuit, and the thermal consumers are arranged in series with respective Pressure Independent Control Valves (PICVs). A differential pressure sensor is adapted to sense a differential pressure indicative for the differential pressure over a critical one of the Pressure Independent Control Valves, and a signal from the differential pressure sensor is used by the control device as basis for controlling the pump system.

12 Claims, 3 Drawing Sheets

(51) Int. Cl.
*B63J 2/02* (2006.01)
*B63J 2/12* (2006.01)

(56) References Cited

U.S. PATENT DOCUMENTS

| | | |
|---|---|---|
| 7,421,983 B1 | 9/2008 | Taylor |
| 2009/0090116 A1 | 4/2009 | Liu |
| 2013/0048114 A1* | 2/2013 | Rothman ............... G05B 15/02 137/551 |
| 2013/0048745 A1* | 2/2013 | Johnson, Jr. ........ F24D 19/1009 122/448.1 |
| 2013/0240172 A1* | 9/2013 | Reilly ................. F24D 19/1018 165/11.1 |
| 2014/0372164 A1* | 12/2014 | Egan ..................... G06T 11/206 705/7.22 |
| 2015/0135746 A1* | 5/2015 | Louvar ................... F24F 11/70 62/200 |
| 2015/0136377 A1* | 5/2015 | Kallesoe .................. F24D 5/04 236/13 |
| 2016/0031542 A1* | 2/2016 | Yin ......................... F01P 3/207 700/282 |
| 2017/0204866 A1 | 7/2017 | Edmondson, Jr. et al. |
| 2019/0032940 A1* | 1/2019 | Danielson ................ F24F 11/62 |
| 2019/0353385 A1 | 11/2019 | Aucoin et al. |
| 2020/0348064 A1* | 11/2020 | Takenaka ................ F24F 11/49 |
| 2021/0041839 A1* | 2/2021 | Chen .................... G05B 13/048 |
| 2021/0164684 A1* | 6/2021 | Takenaka ................ F25B 13/00 |
| 2022/0082283 A1* | 3/2022 | Kato ..................... F24F 1/0003 |
| 2022/0228766 A1* | 7/2022 | Nakahara ................ F25B 49/02 |

FOREIGN PATENT DOCUMENTS

| | | |
|---|---|---|
| CN | 109131819 A | 1/2019 |
| CN | 110410918 A | 11/2019 |
| CN | 211139637 U | 7/2020 |
| JP | H01303157 A | 12/1989 |
| JP | 2009275512 A | 11/2009 |
| JP | 2017221876 A | 12/2017 |
| KR | 20190081315 A | 7/2019 |
| TW | 201617267 A | 5/2016 |

OTHER PUBLICATIONS

Office Action received in Danish application No. PA 2022 70007 indicating approval for grant, dated Jul. 13, 2023.
Office Action received in related Danish application No. PA 2022 7007 indicating intention to grant, dated Mar. 29, 2023.
Office Action received in related Danish application No. PA 2022 7007, dated Jul. 18, 2022.
First Office Action, dated Mar. 29, 2025, 9 pages, issued in Chinese application No. 202380016367.X.

* cited by examiner

THERMAL SYSTEM FOR A MARINE VESSEL, SUCH SYSTEM INSTALLED IN A MARINE VESSEL, A MARINE VESSEL COMPRISING THE THERMAL SYSTEM, A METHOD OF CONTROLLING A THERMAL SYSTEM, AND A CONTROL DEVICE

CROSS-REFERENCE TO RELATED APPLICATIONS

This application is the national phase of, and claims priority to, International Application No. PCT/DK2023/050004, filed 6 Jan. 2023, which claims priority to Danish Application No. PA 2022 70007, filed 10 Jan. 2022.

FIELD OF THE INVENTION

The invention relates to a thermal system for marine vessels, marine vessels comprising thermal systems, and systems and methods for controlling such thermal systems.

SUMMARY

The invention relates to a thermal system for a marine vessel, comprising: a thermal liquid circuit; a pump system for circulating a thermal liquid in the thermal liquid circuit; a number of thermal consumers, said thermal consumers being arranged in parallel in said thermal liquid circuit, and said thermal consumers being arranged in series with respective Pressure Independent Control Valves (PICVs); and a control device for controlling the pump system.

WRITTEN DESCRIPTION

Figure 1:
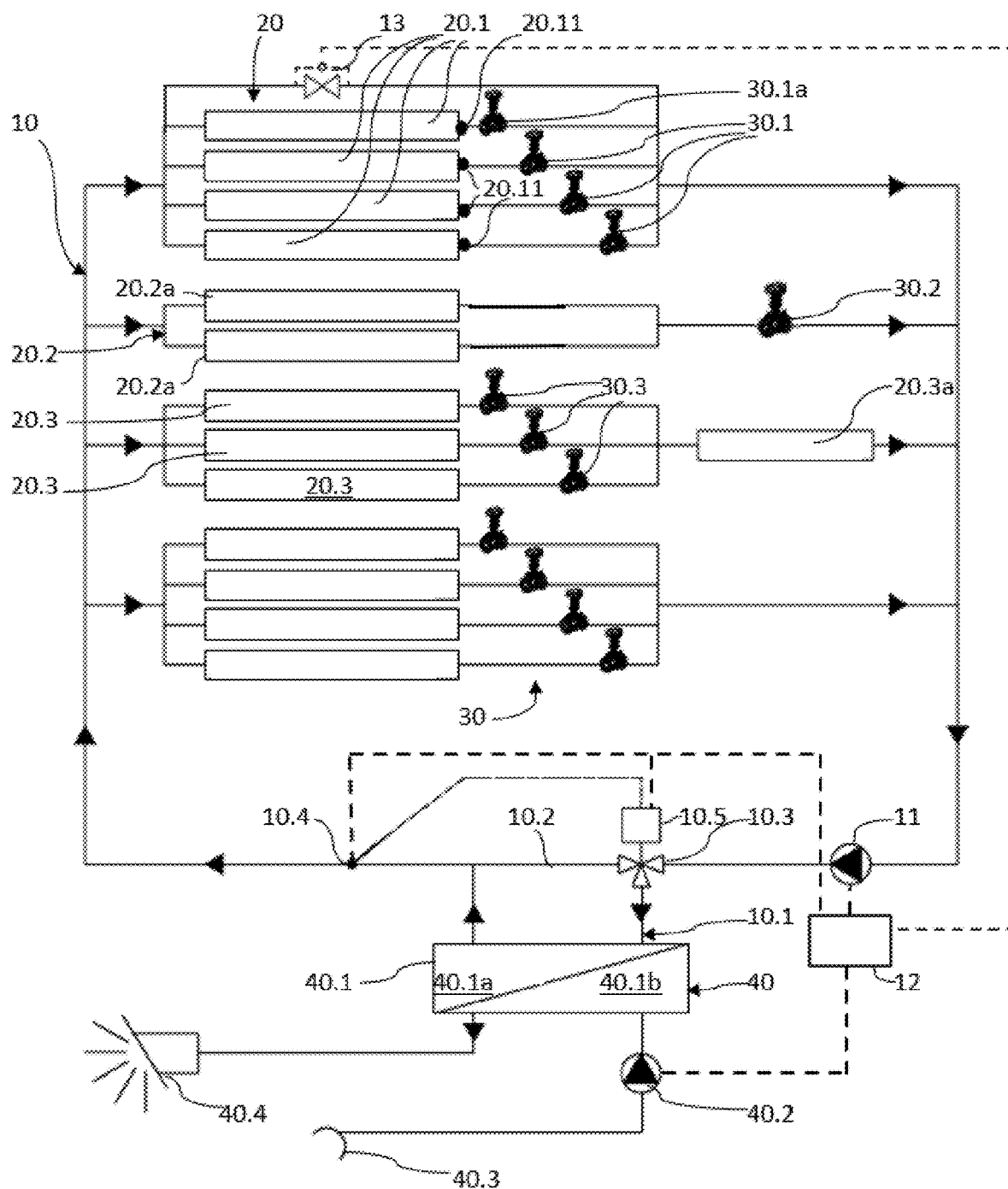
FIG. 1 shows a diagram of a cooling system according to the present invention.

In marine vessels or ships of a certain size, thermal systems, such as cooling systems, are used to provide cooling for a number of cooling consumers.

It should be noted that whereas cooling is the primary object of the invention, the invention may be used in connection with central heating in marine vessels or ships as well. Accordingly, the term "thermal" may herein be understood as either "cooling" or "heating".

Considering that in many cases approx. 20% of a ship's production of electric power is used for driving pumps, a reduction of a demand for pump energy may provide for substantial energy saving in the operation of a marine vessel or ship.

Thermal systems, especially cooling systems, use pumps to circulate a thermal, especially cooling liquid, in a liquid circuit that may be widely branched around the ship where e.g. cooling is need, i.e. where thermal or cooling consumers are found.

For easy of explanation, in the following reference will be made to cooling.

Cooling consumers may include engines and other machine devices, air conditioners, etc.

Whereas under some circumstances the cooling demand of different consumers is relatively constant, under other circumstances the cooling demand may e.g. be lower than usual, e.g. when an engine is running at only partial load.

In a thermal or cooling system of the kind mentioned by way of introduction the amount of thermal or cooling liquid circulated through a given consumer is controlled by a PICV i.e. a Pressure Independent Control Valve. Such valves are known in the art and generally comprise a pressure absorbing part or mechanism, generally known as a differential pressure regulator, that will absorb a part of a differential pressure applied to the valve whereby another part of the valve is able to provide at least approximately an intended flow through the valve in dependence of the residual of the differential pressure, said residual being regulated by the pressure absorbing part of the valve. The residual pressure may thus be held constant by means of the pressure absorbing part of the valve.

A PICV demands a certain differential pressure to be applied to it in order to be able to regulate the flow through it adequately.

Accordingly, in a thermal or cooling system of the prior art the pump system is run at a level to ensure that throughout the thermal or cooling system sufficient differential pressure is found.

However, since in many cases a large part of the differential pressure thus provided is absorbed by the PIVCs in the system, running the pump system at a default high level to ensure sufficient differential pressure throughout the thermal or cooling system entails a great amount of loss of energy. It is an object of the invention to reduce such loss of energy.

This object, among others, is obtained in a thermal system of the kind mentioned by way of introduction, which is characterized by a differential pressure sensor adapted to sense a differential pressure indicative for the differential pressure over a critical one of said Pressure Independent Control Valves, whereby a signal from said differential pressure sensor is used by the control device as basis for controlling the pump system.

By the term "critical" in relation to the pressure independent control valves (PICVs) should be understood a PICV in the thermal or cooling system where the differential pressure is expected to be at risk of becoming too low if the pump energy is lowered to a too low level.

By the expressions like "differential pressure over an element (e.g. a valve)", "differential pressure applied to an element (e.g. a valve)", etc. should be understood the difference between a pressure (immediately) upstream of said element and a pressure (immediately) downstream of said element.

It should be understood that the demand for differential pressure of a given PICV may be different from the demand for differential pressure of another PICV which should be taken into consideration when selecting which PICV to regard as the critical PICV in a given thermal or cooling system.

The differential pressure sensed or measured by the differential pressure sensor may be the combined differential pressure over a thermal consumer and the PICV attached to it. In such case the differential pressure measured is indicative for the differential pressure over the PICV: When the flow resistance of the thermal client is known at least by an estimated value, based on the measured differential pressure and the known or estimated value of the flow resistance of the thermal consumer the differential pressure over the PICV may be calculated or approximated as the indicated differential pressure.

In relation to the term "pump system" it should be noted that the pump system may comprise a single pump or a higher number of pumps operating in parallel or in series, as it is known in the art.

In an embodiment the thermal liquid is water, preferably fresh water. Hereby "fresh water" should be understood as opposed to the salty water in which the marine vessel will usually be sailing. Thus, the term "fresh water" should not be understood as excluding any additives, such as corrosion inhibitors, etc. that are usually added to the circulating liquid of a thermal or cooling system.

In an embodiment each of the thermal consumers are arranged in series with a Pressure Independent Control Valve whereby the total amount of thermal liquid flow is controlled and balanced by the Pressure Independent Control Valves. This provides for an excellent control of the flow of thermal or cooling liquid throughout the system.

In an embodiment at least one first thermal consumer is arranged in series with a controllable Pressure Independent Control Valve, and preferably a pressure and/or temperature sensor is attached to said first thermal consumer to provide a control signal to control the controllable Pressure Independent Control Valve. Controllable pressure independent control valves are as such known in the art and may e.g. comprise a valve body the position of which is controlled by a control element which per se may receive an input from e.g. a temperature sensor whereby the control element adjusts the position of the valve body to adjust the flow through the PICV and thus through the thermal or cooling consumer attached to the PICV whereby the temperature sensed by the sensor may be kept substantially constant or in accordance with a given scheme. It is also possible that the control element receives an input from a pressure sensor or the PICV may be controlled by an external signal, e.g. a running signal from e.g. a motor or another external signal from individual consumers that are in need of cooling or heating.

In an embodiment a second thermal consumer comprises more minor thermal consumers arranged in parallel and/or series for said minor thermal consumers to be commonly arranged in series with a respective second Pressure Independent Control Valve. Hereby the number of PICVs in the thermal system may be reduced in comparison with a system in which every single consumer is attached to its own PICV.

In an embodiment more differential pressure sensors are provided adapted to sense respective differential pressures indicative for the differential pressure over respective Pressure Independent Control Valves. This may e.g. be appropriate in a thermal system where it is difficult or impossible to determine which PICV is the critical PICV. This may e.g. be the case in a thermal system in which certain thermal consumers are at times shut down and in effect removed from the (active part of) the thermal system. In such embodiment the control device for controlling the pump system may be adapted to use the indicated differential pressure that is closest to the differential pressure demanded for the respective Pressure Independent Control Valve as basis for controlling the pump system. Thus the control device should have knowledge of the differential pressure demand of the PICVs for which the differential pressure is measured, calculated, or indicated and compare for each of these PICVs the differential pressure demand and the measure, calculated, or indicated differential pressure for the respective PICV to determine for which PICV the difference between the measure, calculated, or indicated differential pressure and the differential pressure demand is smallest and then use the differential pressure over that PICV as basis for controlling the pump system.

In an embodiment the thermal system further comprises: a central thermal unit; a branch of the thermal liquid circuit passing through the central thermal unit; a bypass of the thermal liquid circuit, bypassing the central thermal unit; a 3-way valve controlling a rate of flow through said branch and flow through said bypass; a temperature sensor measuring a flow temperature downstream of said branch and said bypass; and a controller for controlling said 3-way valve in response to a signal from the temperature sensor. The central thermal unit may provide cooler or hotter thermal liquid depending on whether the thermal system is a cooling system or a heating system, and by means of the 3-way valve liquid from the central thermal unit may be mixed into the thermal liquid flowing in the thermal liquid circuit to obtain an intended flow temperature in the thermal liquid circuit.

In another embodiment the thermal system further comprises: a central thermal unit; the central thermal unit comprising a heat exchanger with primary side and a secondary side, the primary side being part of the thermal liquid circuit of the thermal system, the secondary side of the central thermal unit being fed with a second thermal liquid by a heat exchanger pump system; a branch of the thermal liquid circuit passing through the central thermal unit; a bypass of the thermal liquid circuit, bypassing the central thermal unit; a 3-way valve controlling a rate of flow through said branch and flow through said bypass; a temperature sensor measuring a flow temperature downstream of said branch and said bypass; and a controller for controlling the heat exchanger pump system in response to a signal from the temperature sensor. In this embodiment the central thermal unit may provide cooler or hotter thermal liquid depending on whether the thermal system is a cooling system or a heating system, and by adjusting the energy provided for the heat exchanger pump system and thus adjusting the level of operation of the heat exchanger pump system, the amount of heat transferred in the heat exchanger may be adjusted thereby adjusting the flow temperature in the thermal liquid circuit to approximate an intended flow temperature in the thermal liquid circuit.

In a further embodiment the controller is adapted to control also said 3-way valve in response to at least a signal from the temperature sensor. Hereby it is possible to e.g. reduce the amount of cooling or heating introduced into the thermal liquid circuit relative to a minimum amount that the central thermal unit is capable of delivering.

In the following the invention will be explained in further detail by means of an example of an embodiment having reference to the schematic drawings. The system comprises a cooling liquid circuit 10; a pump system 11, in the present example represented by a single pump signature, for circulating a cooling liquid in the cooling liquid circuit 10; a number of cooling consumers 20, said cooling consumers 20 being arranged in parallel in said cooling liquid circuit 10, and said cooling consumers 20 being arranged in series with respective Pressure Independent Control Valves (PICVs) 30; and a control device 12 for controlling the pump system 11.

The system further comprises a differential pressure sensor 13 adapted to sense a differential pressure indicative for the differential pressure over a critical one 30.1a of said Pressure Independent Control Valves 30.

The cooling liquid circulated in the cooling liquid circuit 10 is, in the embodiment fresh water with usual additives to prevent corrosion, etc.

In the embodiment each of the cooling consumers 20 are arranged in series with a Pressure Independent Control Valve 30 whereby the total amount of cooling liquid flow is controlled and balanced by the Pressure Independent Control Valves 30.

A group of first cooling consumers 20.1 are respectively arranged in series with a controllable first Pressure Independent Control Valve 30.1. A pressure and/or temperature sensor 20.11 is respectively attached to each first cooling consumer 20.1 to provide a control signal to control the controllable first Pressure Independent Control Valve 30.1.

In the present embodiment, a second cooling consumer 20.2 comprises more (two in the example indicated) minor cooling consumers 20.2a arranged in parallel for said minor cooling consumers to be commonly arranged in series with a respective second Pressure Independent Control Valve 30.2.

In the present embodiment, a group of third cooling consumers 20.3, respectively in series with a third Pressure Independent Control Valve 30.3, is commonly arranged in series with a fourth cooling consumer 20.3a having a less demand for low cooling water temperature. The flow through the fourth cooling consumer 20.3a is thus the total of the combined flow through the third cooling consumers 20.3.

The cooling system further comprises a central cooling unit 40.

A branch 10.1 of the cooling liquid circuit is passing through the central cooling unit 40 and a bypass 10.2 of the cooling liquid circuit 10 is bypassing the central cooling unit 40. A 3-way valve 10.3 is controlling a rate of the flow through the branch 10.1 and the flow through the bypass 10.2. A temperature sensor 10.4 is measuring a flow temperature downstream of the branch 10.1 and the bypass 10.2. A controller 10.5 is provided for controlling the 3-way valve 10.3 in response to a signal from the temperature sensor 10.4.

The central cooling unit 40 provides cooler cooling liquid relative to the cooling liquid circulating in the cooling liquid circuit 10, and especially relative to the cooling liquid entering the 3-way valve 10.3, and by the means of the 3-way valve 10.3 the cooler liquid from the central cooling unit 40 may be mixed into the cooling liquid flowing in the cooling liquid circuit 10 to obtain an intended flow temperature in the cooling liquid circuit as measured by the temperature sensor 10.4.

The central cooling unit 40 comprises a heat exchanger 40.1 with a primary side 40.1a and a secondary side 40.1b. The primary side 40.1a is part of the cooling liquid circuit 10 of the cooling system. The secondary side 40.1b of the central cooling unit 40 is being fed with a second thermal liquid by a heat exchanger pump system 40.2. The second thermal liquid is in the embodiment shown seawater taken in through a seawater inlet 40.3 from the surrounding seawater, through which the vessel is sailing, to be circulated by the heat exchanger pump system 40.2 through the secondary side 40.1b of the heat exchanger 40.1, and to be expelled back into the surrounding seawater through a seawater discharge 40.4.

In an embodiment, a controller, e.g. the control device 12, is adapted for controlling the heat exchanger pump system 40.2 in response to a signal from the temperature sensor 10.4.

In such embodiment the central cooling unit 40 may provide for cooling the entire amount of water circulated in the cooling liquid circuit by adjusting the 3-way valve 10.3 to pass all water through the heat exchanger 40.1 shutting off the bypass 10.2. By adjusting the energy provided for the heat exchanger pump system 40.2 and thus adjusting the level of operation of the heat exchanger pump system 40.2, the amount of heat transferred in the heat exchanger may be adjusted thereby adjusting the flow temperature in the thermal liquid circuit to approximate an intended flow temperature as indicated by the temperature sensor 10.4.

Further in such embodiment, the control device 12 may be adapted to control also the 3-way valve 10.3 or to activate the controller 10.5 in response to at least a signal from the temperature sensor 10.4. Hereby it is possible to e.g. reduce the amount of cooling introduced into the thermal liquid circuit 10 relative to a minimum amount that the central thermal unit 40 is capable of delivering.

As indicated above, the cooling consumers 20 are respectively arranged in series with a Pressure Independent Control Valve 30 whereby the flow of cooling liquid in the cooling liquid circuit 10 is controlled and balanced by the Pressure Independent Control Valves 30.

The Pressure Independent Control Valves 30 respectively need a certain minimum differential pressure in order to be able to control flow as intended for the respective Pressure Independent Control Valves 30. This differential pressure is provided throughout the cooling liquid circuit 10 by the pump system 11.

In order to reduce the power supplied to the pump system 11 to a minimum securing a sufficient differential pressure throughout the cooling liquid circuit 10, an indication of the differential pressure applied to the critical Pressure Independent Control Valve 30.1a is obtained by means of the differential pressure sensor 13, and the pump system 11 is adjusted by the control device 12 in accordance with said indication of the differential pressure applied to the critical Pressure Independent Control Valve 30.1a. Hereby considerable energy saving is obtained compared to a system in which a pump system is run constantly at a default power.

Figure 1A:
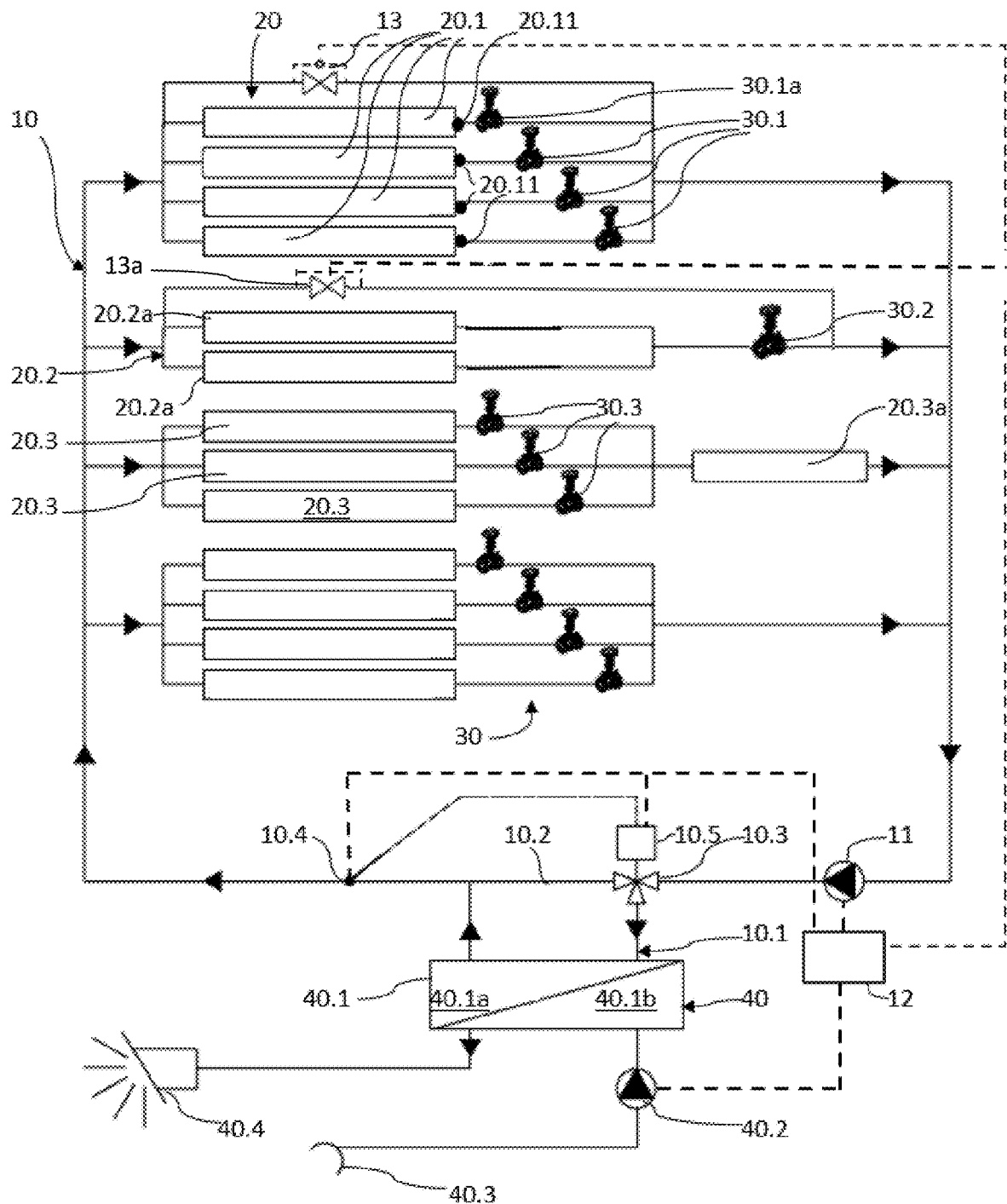
FIG. 1a shows a diagram of an alternative embodiment of a cooling system according to the present invention.

In FIG. 1a, an alternative embodiment is shown, where, as exemplified by a differential pressure sensors 13a, more differential pressure sensors are provided adapted to sense respective differential pressures indicative for the differential pressure over respective Pressure Independent Control Valves 30, and the control device 12 for controlling the pump system 11 is adapted to use the indicated differential pressure that is closest to the differential pressure demanded for the respective Pressure Independent Control Valve as basis for controlling the pump system. Especially it is foreseen that each Pressure Independent Control Valve 30 comprises or has attached a respective differential pressure sensor.

Figure 2:
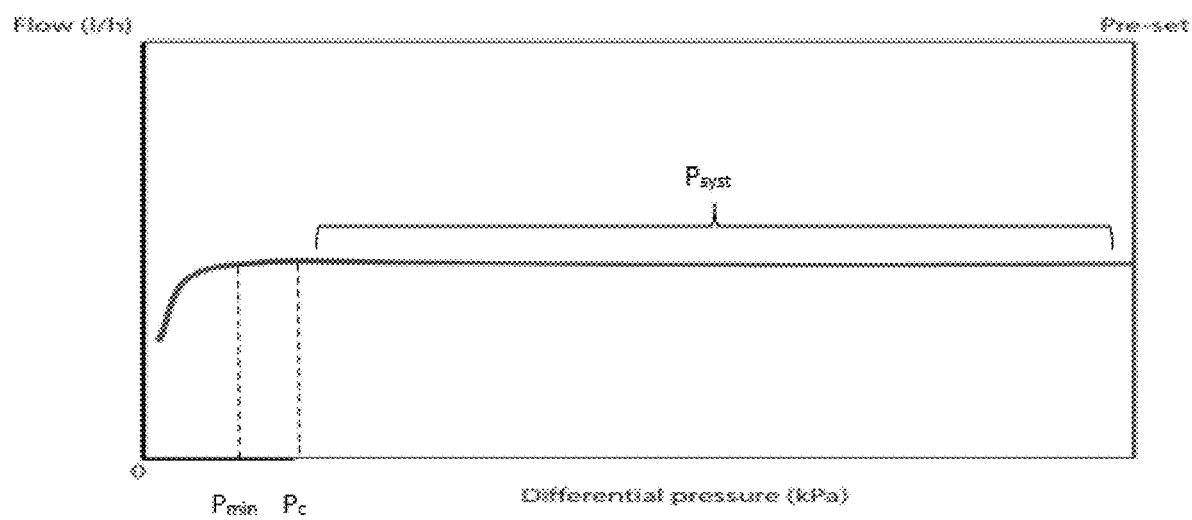
FIG. 2 illustrates the characteristics of a PICV in a pressure/flow regime.

FIG. 2 illustrates how a generally constant flow is provided by the respective Pressure Independent Control Valves 30 in the cooling liquid circuit 10 (assuming that all of the Pressure Independent Control Valves 30 are intended to provide the same flow). $P_{min}$ indicates the minimum differential pressured required by the critical Pressure Independent Control Valves 30.1a. The pump system 11 is adjusted to run at a speed providing the pressure $P_c$ at the critical Pressure Independent Control Valves 30.1a as indicated by the differential pressure sensor 13. Due to general pressure loss in the cooling liquid circuit 10 the lowest differential pressure will be in the vicinity of the critical Pressure Independent Control Valves 30.1a and throughout the rest of the cooling liquid circuit 10 higher differential pressures will be present as indicated in FIG. 2 by $P_{syst}$. The differential pressure regulators of the respective Pressure Independent Control Valves 30 will absorb the superfluous pressure at the respective Pressure Independent Control Valve 30 for said valve to provide the intended flow as indicated in FIG. 2, as it will be well-known to the person skilled in the art.

The invention claimed is:

1. A thermal system in a marine vessel, comprising:
a thermal liquid circuit;
a pump system for circulating a thermal liquid in the thermal liquid circuit;
a number of thermal consumers, said thermal consumers being arranged in parallel in said thermal liquid circuit, and said thermal consumers being arranged in series with respective Pressure Independent Control Valves (PICVs); and
a control device for controlling the pump system,
the thermal system further comprising a differential pressure sensor adapted to sense a differential pressure indicative for the differential pressure over a critical one of said Pressure Independent Control Valves, whereby a signal from said differential pressure sensor is used by the control device as basis for controlling the pump system.

2. The thermal system according to claim 1, wherein the thermal liquid is water.

3. The thermal system according to claim 1, wherein each of the thermal consumers are arranged in series with a Pressure Independent Control Valve whereby the total amount of thermal liquid flow is controlled and balanced by the Pressure Independent Control Valves.

4. The thermal system according to claim 1, wherein at least one first thermal consumer is arranged in series with a controllable Pressure Independent Control Valve.

5. The thermal system according to claim 1, wherein a second thermal consumer comprises more minor thermal consumers arranged in at least one of parallel and/series for said minor thermal consumers to be commonly arranged in series with a respective second Pressure Independent Control Valve.

6. The thermal system according to claim 1, wherein more differential pressure sensors are provided adapted to sense respective differential pressures indicative for the differential pressure over respective Pressure Independent Control Valves, and wherein the control device for controlling the pump system is adapted to use the indicated differential pressure that is closest to the differential pressure demanded for the respective Pressure Independent Control Valve as basis for controlling the pump system.

7. The thermal system according to claim 1, further comprising:
a central thermal unit;
a branch of the thermal liquid circuit passing through the central thermal unit;
a bypass of the thermal liquid circuit, bypassing the central thermal unit;
a 3-way valve controlling a rate of flow through said branch and flow through said bypass;
a temperature sensor measuring a flow temperature downstream of said branch and said bypass; and
a controller for controlling said 3-way valve in response to a signal from the temperature sensor.

8. The thermal system according to claim 1, further comprising:
a central thermal unit;
the central thermal unit comprising a heat exchanger with primary side and a secondary side, the primary side being part of the thermal liquid circuit of the thermal system, the secondary side of the central thermal unit being fed with a second thermal liquid by a heat exchanger pump system;
a branch of the thermal liquid circuit passing through the central thermal unit;
a bypass of the thermal liquid circuit, bypassing the central thermal unit;
a 3-way valve controlling a rate of flow through said branch and flow through said bypass;
a temperature sensor measuring a flow temperature downstream of said branch and said bypass; and
a controller for controlling the heat exchanger pump system in response to a signal from the temperature sensor.

9. The thermal system according to claim 8, wherein the controller is adapted to control also said 3-way valve in response to at least a signal from the temperature sensor.

10. The thermal system according to claim 1, wherein the thermal system is a cooling system.

11. The thermal system according to claim 1, wherein the thermal liquid is fresh water.

12. The thermal system according to claim 4, wherein at least one of a pressure sensor and a temperature sensor is attached to said first thermal consumer to provide a control signal to control the controllable Pressure Independent Control Valve.

* * * * *